Sept. 22, 1970 M. V. ZUBATY ET AL 3,530,413

FORCE MULTIPLYING MEANS FOR CIRCUIT BREAKER TRIP UNIT

Filed Aug. 15, 1968 7 Sheets-Sheet 1

INVENTORS
MARTIN V. ZUBATY
ROBERT W. THOMAS
BY
OSTROLENK, FABER, GERB & SOFFEN
ATTORNEYS

Sept. 22, 1970 M. V. ZUBATY ET AL 3,530,413

FORCE MULTIPLYING MEANS FOR CIRCUIT BREAKER TRIP UNIT

Filed Aug. 15, 1968 7 Sheets-Sheet 3

FORCE MULTIPLYING MEANS FOR CIRCUIT BREAKER TRIP UNIT

INVENTORS
MARTIN V. ZUBATY
ROBERT W. THOMAS
BY
OSTROLENK, FABER, GERB & SOFFEN
ATTORNEYS

INVENTORS
MARTIN V. ZUBATY
ROBERT W. THOMAS
BY
OSTROLENK, FABER, GERB & SOFFEN
ATTORNEYS

United States Patent Office 3,530,413

Patented Sept. 22, 1970

3,530,413

FORCE MULTIPLYING MEANS FOR CIRCUIT BREAKER TRIP UNIT

Martin V. Zubaty, Warren, and Robert W. Thomas, St. Clair Shores, Mich., assignors to I-T-E Imperial Corporation, Philadelphia, Pa., a corporation of Pennsylvania Filed Aug. 15, 1968, Ser. No. 752,888

Int. Cl. H01h 77/00

U.S. Cl. 335—9 6 Claims

ABSTRACT OF THE DISCLOSURE

A so-called push-push type circuit breaker in which an automatic tripping impulse in any one of a plurality of phases includes means effective to operate the trip units of all other phases so that all phases of the circuit breaker open at substantially the same time. Such includes a force multiplier provided by a cam surface on the tripper of one phase. Such cam surface is engaged by and cooperating with a contact arm formation which, upon operation of such contact arm to open circuit position, transmits forces generated by the main operating spring to operate a common trip bar to trip position and thereby open the contacts of all of the circuit breaker phases.

This invention relates to circuit breakers in general, and more particularly relates to a multi-phase push-push type circuit breaker having force mulitplying means through which opening forces of the main operating spring of a single phase are transmitted to operate a common trip bar for opening of the other phases.

The E. T. Platz U.S. Pat. No. 3,233,063 issued Feb. 1, 1966 for a multi-pole circuit breaker discloses a so-called push-push type device with three phases each having an individual automatic tripping means and an individual set of cooperating contacts. A single operating mechanism is constructed to operate all phases of the circuit breaker. In particular, when the movable contact arm of any phase is released through operation of the automatic trip unit of this phase the contact arm biasing spring causes such contact arm to pivot and thereby operate a common tripper bar which, in turn, actuates the automatic trip mechanims of the other phases to cause opening of the contacts in these phases.

In order to improve reliability of operation which might be adversely affected by the quality of mounting for the common trip bar and the numerous springs acting thereon the instant invention provides means for multiplying force exerted by the contact operating spring of the trip phases for operation of the common trip bar which acts to release the automatic trip mechanisms of all other phases. Such force multiplying means comprises a cam surface on the latch carrying tripper. The cam surface is engaged by a portion of a movable contact arm so that a relatively low force is sufficient to operate the common trip bar after the contact arm of one phase is released.

Accordingly, a primary object of the instant invention is to provide improved means for transmitting tripping forces from one phase of a circuit breaker to all other phases thereof.

Another object is to provide a force multiplying means for transmitting a tripping impulse from one phase of a multiphase circuit breaker to other phases thereof.

A further object is to provide a force multiplying means of this type comprising a cam surface across which an extension of a pivotally mounted contact arm rides to pivot a tripper thereby operating a common trip bar.

These as well as further objects of this invention shall become readily apparent after reading the following description of the accompanying drawings in which:

FIG. 9 is a view similar to FIGS. 4 and 6 with the manual operating handle depressed for turning the circuit breaker on.

FIG. 10 is a view similar to FIGS. 5, 7 and 8 with the common operation elements in positions corresponding to those occupied by the elements illustrated in FIG. 9.

In the following description of a multiphase circuit breaker, like elements of different phases are distinguished in the plan views by the reference numeral letter suffix. However, in the side cross-sections these letter suffixes are omitted.

Figure 1:
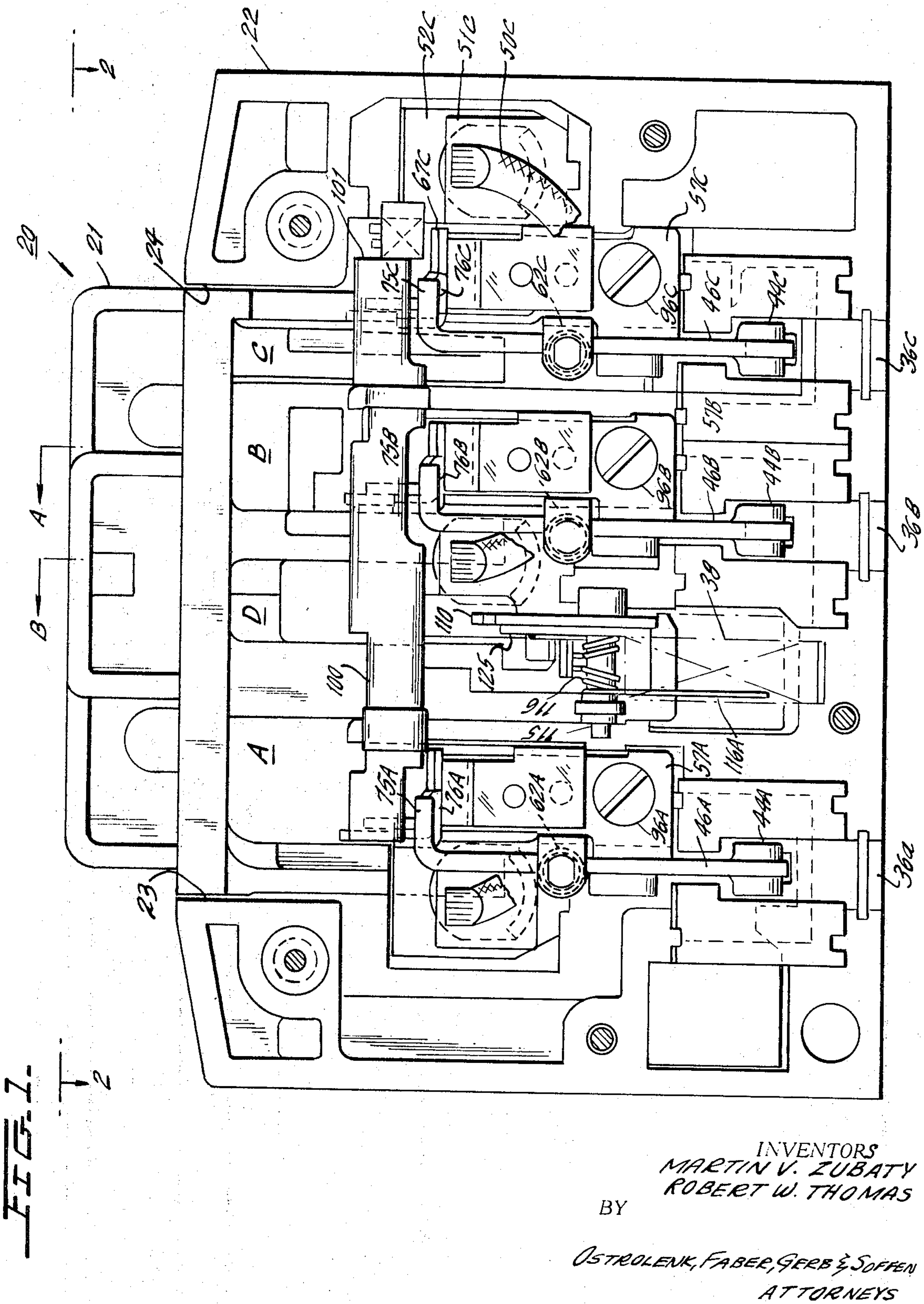
FIG. 1 is an enlarged rear elevation of a three phase circuit breaker constructed in accordance with the teaching of the instant invention with the front cover removed to reveal the internal elements.

Now referring to the figures. Circuit breaker 20 is a three phase unit having manual operating handle 21 to bring about simultaneous opening and closing of the contacts of all three phases. Handle 21 is mounted within insulated housing 22 between abutments 23, 24 thereof for straight line reciprocating motion. As most clearly seen in FIG. 1, housing 22 is divided into four side-by-side elongated compartments extending generally in the direction of movement for handle 21. These compartments A, B, C and D are for the most part formed by integral housing partitions and posts described in the aforesaid U.S. Pat. No. 3,233,063. Chambers A, B and C each contain the individual current carrying and automatic tripping elements for a single circuit breaker phase while Chamber D houses the common operating elements for all three phases.

As also described in U.S. Pat. No. 3,233,063 housing 22 further includes trip element chambers, as well as line terminal apertures, and load terminal apertures. Still further, housing 22 contains venting apertures 36A, 36B, 36C and seat formation 37 to receive one end of handle return spring 38. The front of housing 22 is closed by metal cover 39 having hooks 40 for the mechanical mounting of circuit breaker 20 and an insulating liner sheet 41 interposed between cover 39 and housing 22. In a manner well-known to the art, rivets secure cover 39 and liner 41 to housing 22. Other salient structural features of housing 22 will be referred to in their relationship to the other elements of circuit breaker 20.

Since the current carrying elements and automatic tripping elements for each of the phases are substantially identical only the elements of a single phase will be described. The current path through each phase extends from the portion of line terminal member 43 external of housing 22 to the portion thereof internal of housing 22 which mounts stationary contact 44, movable contact 45, contact carrying arm 46, braid 47, bimetal bracket 48, bimetal 49, braid 50, load terminal 51 and barrel connector 52 mounted to the portion of load terminal 51 disposed externally of housing 22.

Figure 4:
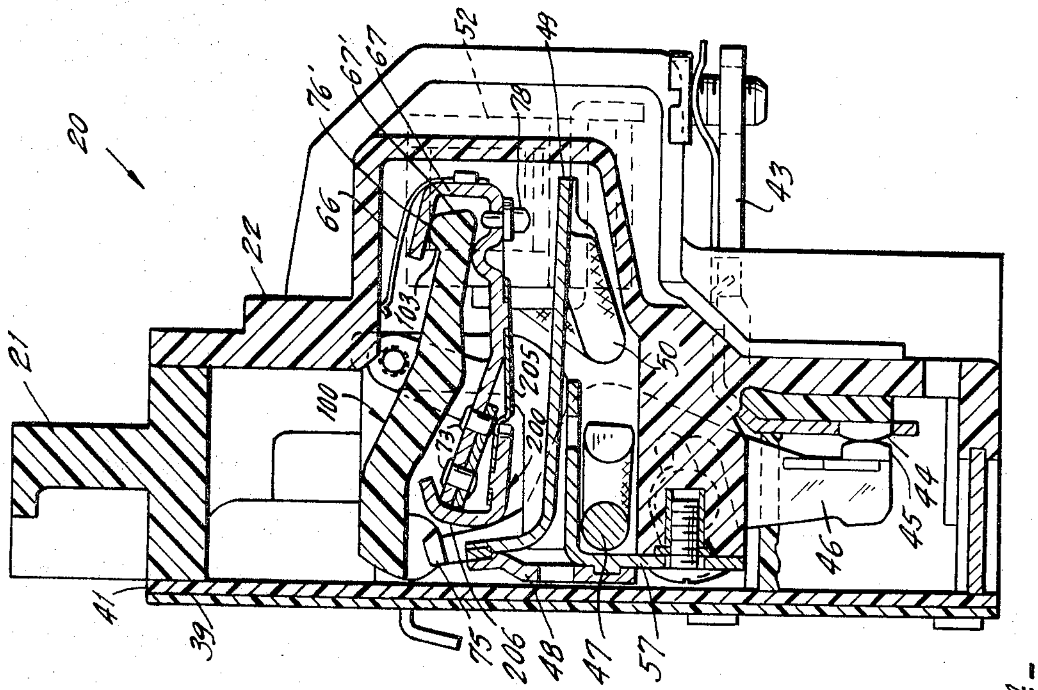
FIG. 4 is a side elevation showing the elements of one phase in the ON position.
Figure 2:
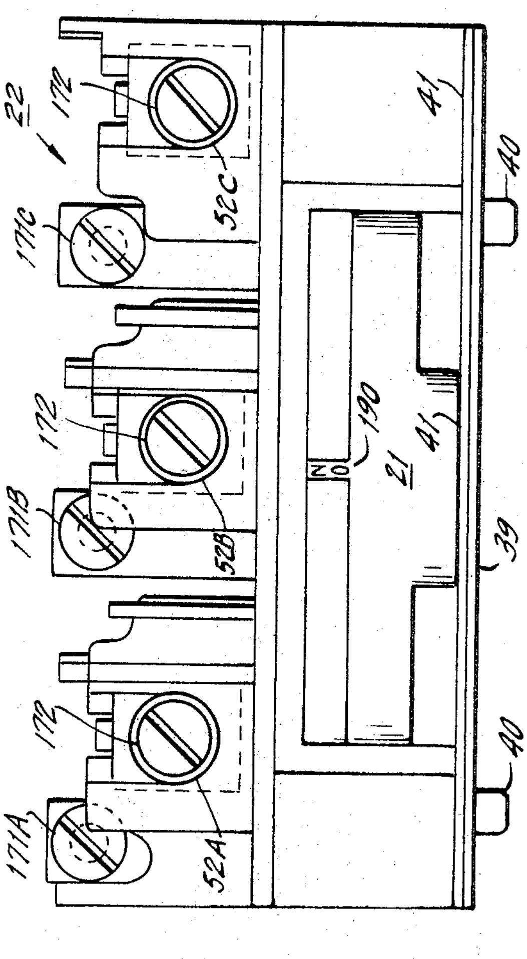
FIG. 2 is a plan view of the circuit breaker of FIG. 1.
Figure 12:
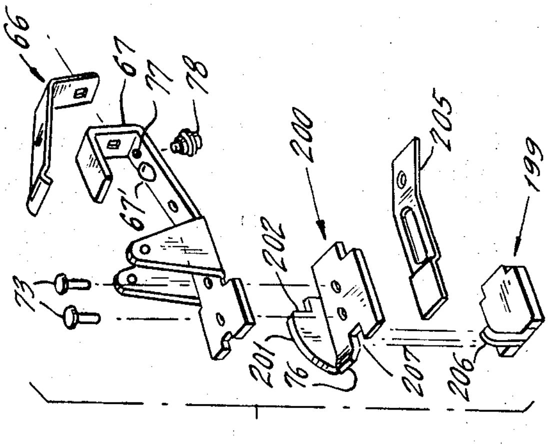
FIG. 12 is an exploded perspective of a tripper and elements secured thereto.
Figures 3, 3A, 3B, 3C, 3D:
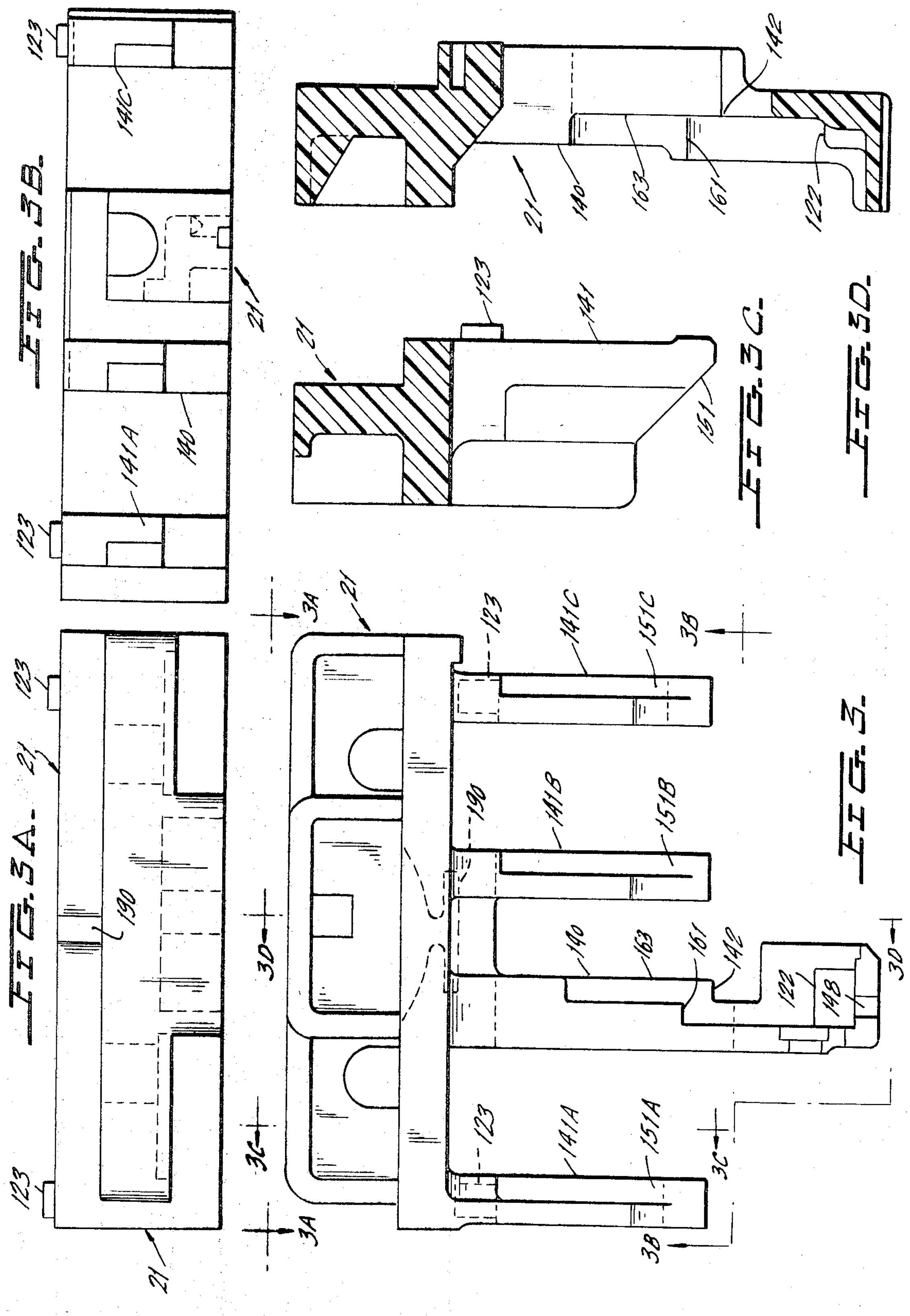
FIG. 3 is a front elevation of the operating handle.
FIG. 3A is a plan view of the operating handle looking in the direction of arrows 3A—3A of FIG. 3.
FIG. 3B is a bottom view of the operating handle looking in the direction of arrows 3B—3B of FIG. 3.
FIG. 3C is a cross-section taken through line 3C—3C of FIG. 3 looking in the direction of arrows 3C—3C.
FIG. 3D is a cross-section taken through line 3D—3D.
Figure 15:
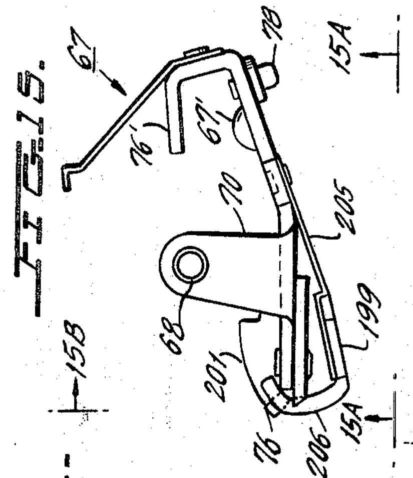
FIG. 15 is a side elevation of a tripper and elements secured thereto.
Figure 15A:
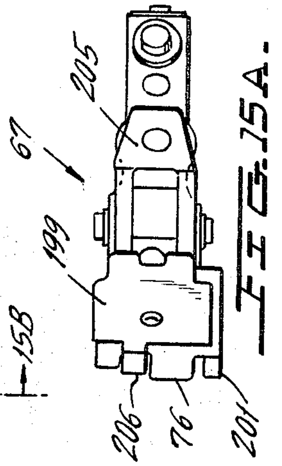
FIG. 15A is a plan view of the elements of FIG. 15 looking in the direction of arrows 15A—15A of FIG. 15.
Figure 15B:
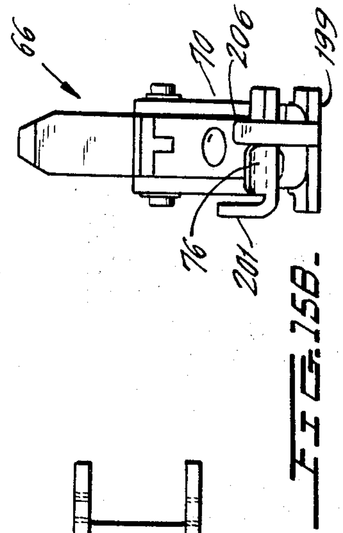
FIG. 15B is a side elevation of the elements of FIG. 15, looking in the direction of arrows 15B—15B of FIG. 15.
Figure 14A:
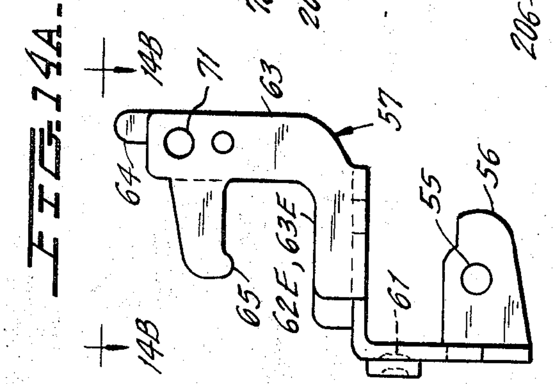
FIG. 14A is a side elevation of the frame looking in the direction of arrows 14A—14A of FIG. 14.
Figure 14B:
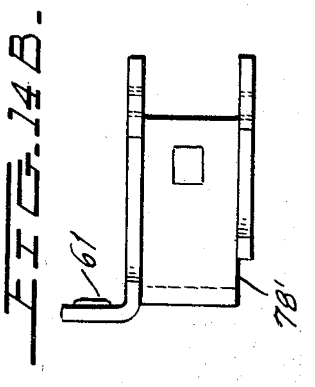
FIG. 14B is a plan view of the frame looking in the direction of arrows 14B—14B of FIG. 14A.
Figure 14:
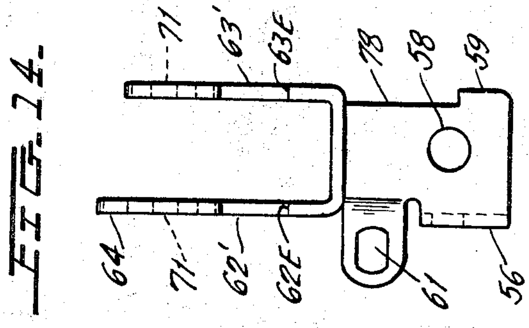
FIG. 14 is a rear elevation of the automatic trip mechanism frame.

Contact arm 46 is provided with elongated aperture 53 for receiving pin 54 which extends through aperture 55 of bracket flange 56 to pivotally secure contact arm 46 to frame 57 with limited translational motion included so that elongated aperture 53 and cooperating pin 54 constitute a lost motion pivotal mounting for contact arm 46. Frame 57 (FIGS. 14–14B) is operatively positioned by an internal formation of housing 22 closely fitted to aperture 58. In the downward extension 59 at the rear of frame 57 screw 96 extending through aperture 58 into a threaded insert (not shown) secures frame 57 in operative position. Frame 57 is provided with dimple 61 which locates one end of main spring 62 whose other end surrounds contact arm projection 63 to bias contact arm 46 to its circuit closing portion when the upper end 75 thereof is fixed by the circuit breaker latch 76, as will be hereinafter explained. Frame 57 further includes upwardly extending spaced parallel walls 62', 63' formed with magnet pole faces 62E and 63E, respectively. Wall 63' is provided with blocking nose formation 65 for reasons to be hereinafter explained. Aligned outward projections 68 from the upturned arms 69, 70 of tripper 67 (FIGS. 15 and 15A) received in aligned apertures 71 in walls 62, 63 of frame 57, position tripper 67 between walls 62, 63 and pivotally mount tripper 67 to frame 57. Modified L-shaped leaf spring 66 secured to the front of tripper 67 and bearing against housing 22 biases tripper 67 in a clockwise direction with respect to FIG. 4 about projections 68 as a center. Motion in this direction is limited through the engagement of tripper extension 74 with frame nose 65.

Rivets 73 secure bent sheet steel element 200 to the rear end of tripper 67. Upwardly extending latching tip 76 at the rear of element 200 is positioned to engage inturned formation 75 at the upper end of contact arm 46. When latching tip 76 releases arm 46 spring 62 pivots arm 46 clockwise driving formation 75 along wedge-like convex cam surface 201 at the right upper edge of side formation 202 of element 200 causing positive counterclockwise rotation of tripper 67, for a reason to be hereinafter explained. It is noted that cam surface 201 acts to multiply the force applied by spring 62 through contact arm 46 to tripper 67.

The forward end of tripper 67 is turned upwardly and terminates in hook-like tripping formation 76'. Aperture 77 at the forward portion of tripper 67 is provided to receive insulating button 78 which is interposed between bimetal 49 and tripper 67 near the free end of bimetal 49. Cut-out 78' at the side of frame 57 is provided for the passage of bimetal mounting bracket 48, which is welded to frame 57. As will hereinafter be seen, bimetal 49 forms a single energizing turn for a portion of frame 57 constituting the stationary yoke of a magnet.

Magnet armature 199 is welded to leaf spring 205 at one end thereof while the other end of spring 205 is secured to tripper 67 near the midpoint thereof. Spring 205 is positioned below tripper 67 and biases armature 199 downward with respect to tripper 67 to a normal position wherein upwardly and forwardly extending hook 206 at the rear of armature 199 engages the upepr surface of element 200. Cutout 207 in the rear edge of element 200 guides movement of hook 206.

When tripper 67 is in its most clockwise or latching position, the gap between armature 199 and frame 57 is very small so that relatively little magnetic flux is required to pivot tripper 67. While only a very small travel of armature 199 closes this very small gap such travel is sufficient to release contact arm 46. Thereafter, tripper 67 driven by arm 46 is released from armature hook 206, and as a result of the lost motion connection between armature 199 and tripper 67, the latter travels free of tripper 67 to assure that sufficient motion is transmitted to all other phases to cause tripping thereof.

As most clearly seen in FIGS. 1, 4 and 13 through 13E, common tripper bar 100 is an elongated member mounted for pivotal movement in the bearing, cut-outs of the housing partitions. Torsion spring 101 mounted at the right end of tripper bar 100, when viewed in FIG. 1, bears against tripper bar lug 102 and a portion of housing 22 to bias tripper bar 100 in a clockwise direction with respect to FIG. 4. Bar 100 is provided with trip extensions 103A, 103B and 103C which extend beneath the inturned tip 76' of tripper 67. In a manner to be hereinafter explained, when tripper bar 100 is rotated counterclockwise with respect to FIG. 4 tip 103 engages tripper end 76' causing tripper 67 to rotate counter-clockwise with respect to FIG. 4 to move its latching tip 76 downward so that contact arm end 75 is released and main spring 62 is effective to separate cooperating contacts 44, 45.

Figure 5:
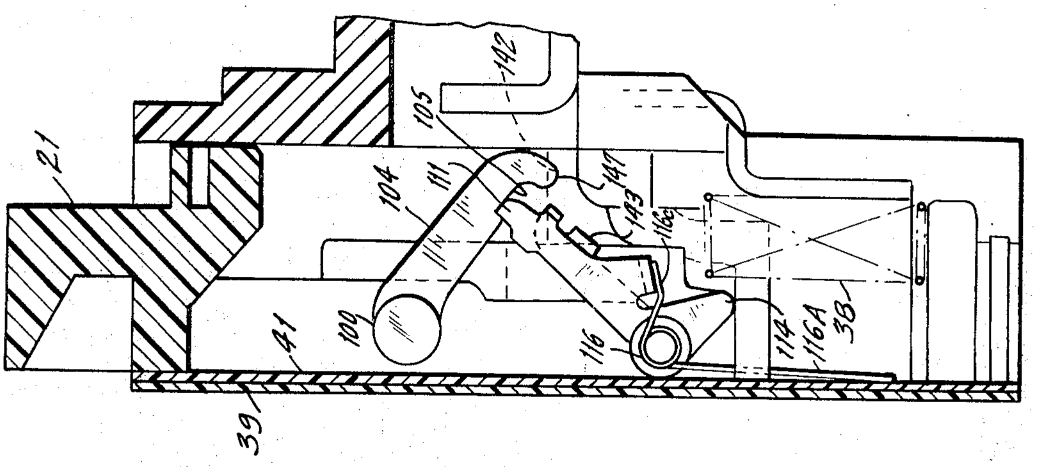
FIG. 5 shows the positions of the common operating elements when the phase elements are in the ON position of FIG. 4.
Figure 17A:
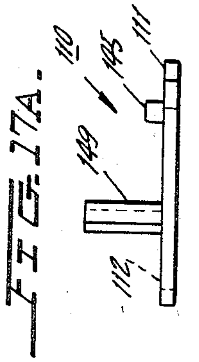
FIG. 17A is an elevation of the lever element looking in the direction of arrows 17A—17A of FIG. 17.
Figure 17:
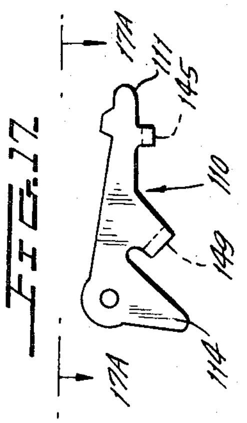
FIG. 17 is a side elevation of a lever element.

Tripper bar 100 is also provided with extension 104 which is entered into mechanism chamber D. Extension 104 is provided with notch 105 which receives the free end 111 of lever 110 (FIGS. 5, 17 and 17A). Lever 110 is constructed of sheet material and is pivoted about a center defined by pin 115 which extends through lever aperture 112 at the end of the lever remote from tip 111. Torsion spring 116 biases lever 110 counterclockwise with respect to FIG. 5. With lever tip 111 positioned within tripper bar notch 105 and resting against notch surface 105A tripper bar 100 is in a so-called reset position, as will hereinafter become apparent. With lever 110 positioned as in FIG. 5, lever nose 114 is positioned to engage handle leg 122 to limit upward movement of handle 21 to an intermediate position where it projects less than with handle stops 123 engaging internal housing surface 124.

Spring 116 is mounted to pin 115 which extends across compartment D and is journaled in bearing formations 115A, 115B. Spring 116 is a compound torsion unit which not only biases lever 110 in a counterclockwise direction with respect to FIG. 5 but in addition biases ratchet 125 (FIGS. 1, 10, 16 and 16A) in a clockwise direction about pin 115 as a center. Lever 110 is force fitted to pin 115 while aperture 126 at one end of ratchet 125 provides a loose fit so that ratchet 125 is pivotable relative to pin 115.

Figure 7:
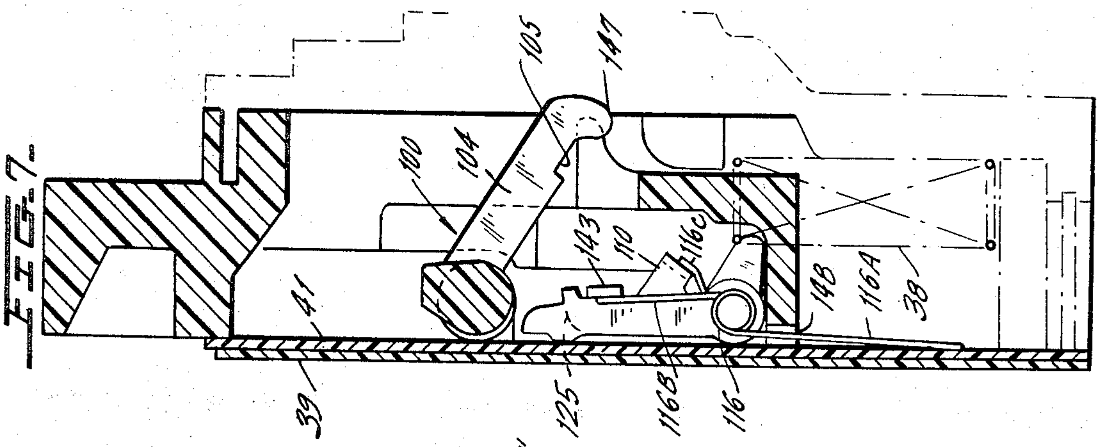
FIG. 7 is a view similar to FIG. 5 with the elements in the OFF position and the manual operating handle released.
Figure 6:
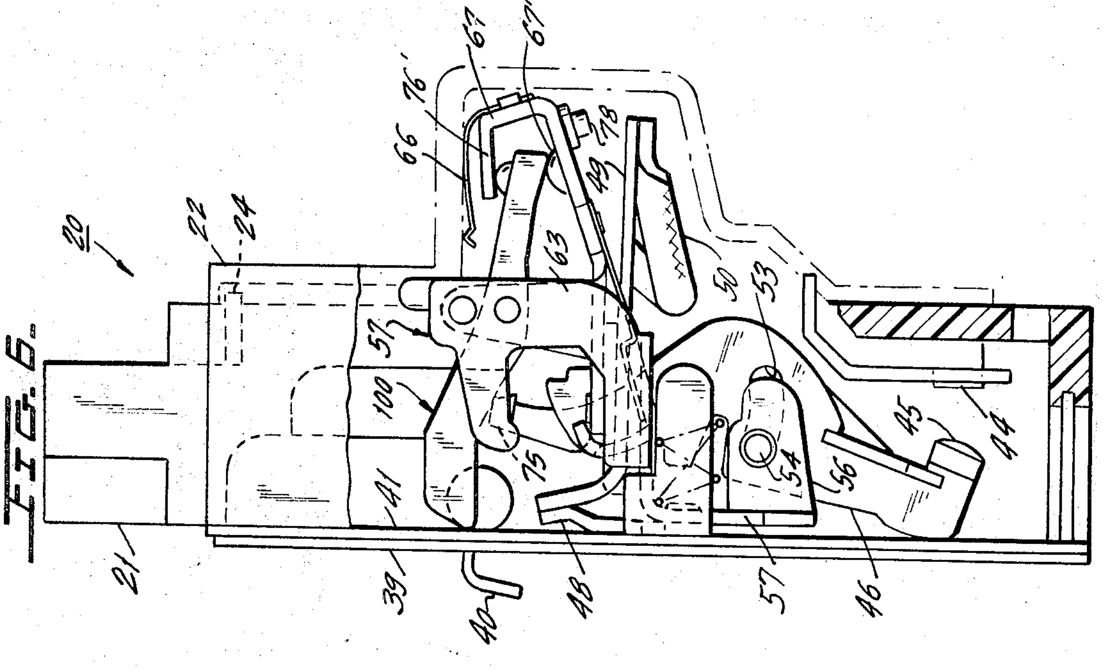
FIG. 6 is a view similar to FIG. 4 with the phase elements in the OFF position and the manual operating handle released.
Figures 11, 13, 13A, 13B, 13C, 13D, 13E:
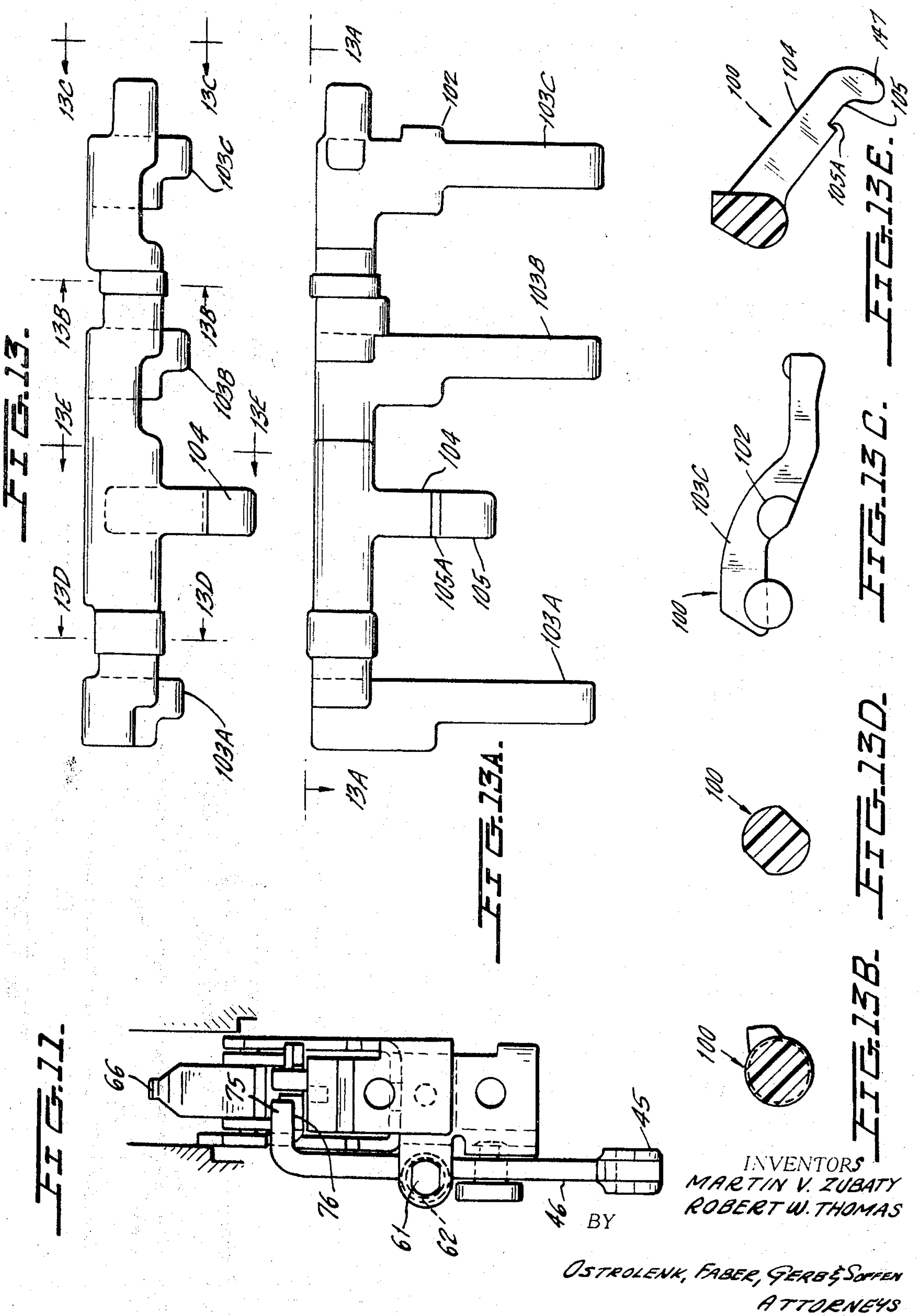
FIG. 11 is a rear elevation of the frame of FIG. 14, assembled with the elements mounted thereto.
FIG. 13 is a plan view of the tripper bar.
FIG. 13A is an elevation of the tripper bar looking in the direction of arrows 13A—13A of FIG. 13.
FIG. 13B is a cross-section taken through line 13B—13B of FIG. 13A looking in the direction of arrows 13B—13B.
FIG. 13C is a side view of the tripper bar looking in the direction of arrows 13C—13C of FIG. 13A.
FIG. 13D is a cross-section taken through line 13D—13D of FIG. 13A looking in the direction of arrows 13D—13D.
FIG. 13E is a cross-section taken through line 13E—13E of FIG. 13A looking in the direction of arrows 13E—13E.
Figure 16A:
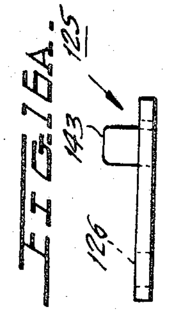
FIG. 16A is a plan view of a ratchet element looking in the direction of arrows 16A—16A of FIG. 16.
Figure 16:
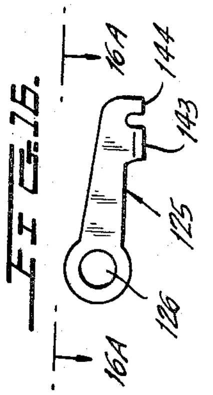
FIG. 16 is a side elevation of a ratchet element.

Handle 21 is provided with axial extension 140 disposed within mechanism compartment D and is also provided with axial extensions 141A, 141B, and 141C disposed within housing compartments A, B and C, respectively. With circuit breaker 20 in the ON position of FIG. 4, upon downward movement of handle 21 extension 140 engages lugs 143 of ratchet 125 rotating ratchet 125 in a clockwise direction. This downward movement is limited by case lug 22' which is engaged by lever lug 145 thereby preventing continued movement of handle 21 from closing contacts 44, 45. The end 144 of ratchet 125 remote from pin 115 engages lever lug 145 thereby rotating lever 110 clockwise. In rotating clockwise, the tip 111 of lever 110 engages nose 147 of trip bar extension 104 causing trip bar 100 to pivot counterclockwise. This in turn causes the free end of trip bar extension 103 to engage tripper end so that tripper 67 is rotated counterclockwise about projections 68 moving the other end 76 of tripper 67 below latching tip 75 of contact arm 46 as shown in FIG. 11. With tip 75 unlatched, spring 62 drives contact arm 46 in a clockwise direction about pivot 54 to separate contact 45 from contact 44. Upon the release of handle 21, the portion of spring 116 urging levers 110 in a counterclockwise direction overcomes the force of the spring portion urging ratchet 125 in a clockwise direction with both lever 110 and ratchet 125 moving in a counterclockwise direction. This movement is limited through the engagement of lever 110 with cover liner 41 (FIG. 7). Handle extension 140 is provided with notch 148 which provides a clearance path for the end 116A of spring 116 which bears against cover line 41. The other end 116B of spring 116 abuts lug 143 of ratchet 125. With circuit breaker 20 in the OFF position, latching tip 75 of contact arm 46 at an end of stroke is in engagment with tripper bar extension 103 to maintain tripper bar extension 103 to maintain tripper bar 100 in a position counterclockwise with respect to the reset position of FIG. 9 and the ON position of FIG. 4.

Tripping due to moderate overcurrent is effective to automatically trip breaker 20 through the upward bending at the free end of bimetal 49 which engages button 78 mounted to tripper 67. This causes tripper 67 to rotate in a counterclockwise direction releasing latching tip 76 as shown in FIG. 11 from latch end 75 of contact arm 46 in the phase where the overload condition exists. Latched end extrusion 67' of the overloaded phases engages its associated tripper bar extension 103 as contact arm 46 moves to the OFF position. This rotates all three trip bar extensions 103 in a counterclockwise direction into engagement with tripper ends 76' thereby rotating the trippers 67 of the other phases in a counterclockwise direction so as to release the other latching tips 76 from the latch ends 75 of their associates contact arms 46 thereby enabling springs 62 of the other phases to separate the cooperating contacts thereof.

A similar operation takes place upon the occurrence of higher magnitude overcurrents. Under these conditions current flowing through bimetal 49 energizes the magnet formed by frame 57. The flux generated causes armature 199 to be attracted to pole faces 62E, 63E thereby rotating tripper 67 counterclockwise releasing the contact arm 46 of the overloaded phase. This contact arm pivots trip bar 100 and by so doing the trippers of the other phases are operated to release the contact arms of these other phases.

If thermal or magnetic tripping should occur during the closing stroke of handle 21 it is apparent that contact arm ends 75 cannot be latched so that main springs 62 will be ineffective to bring about closing of circuit breaker 20.

Figures 9, 10:
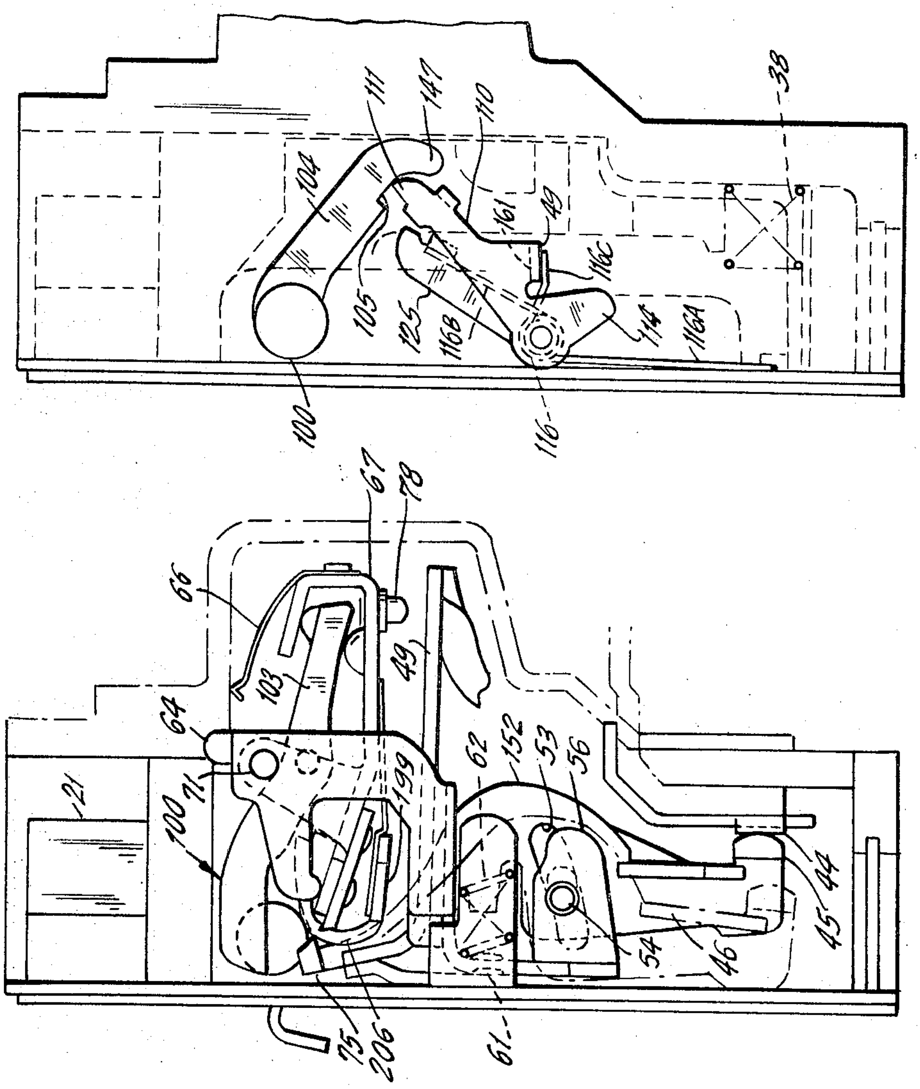
Figure 8:
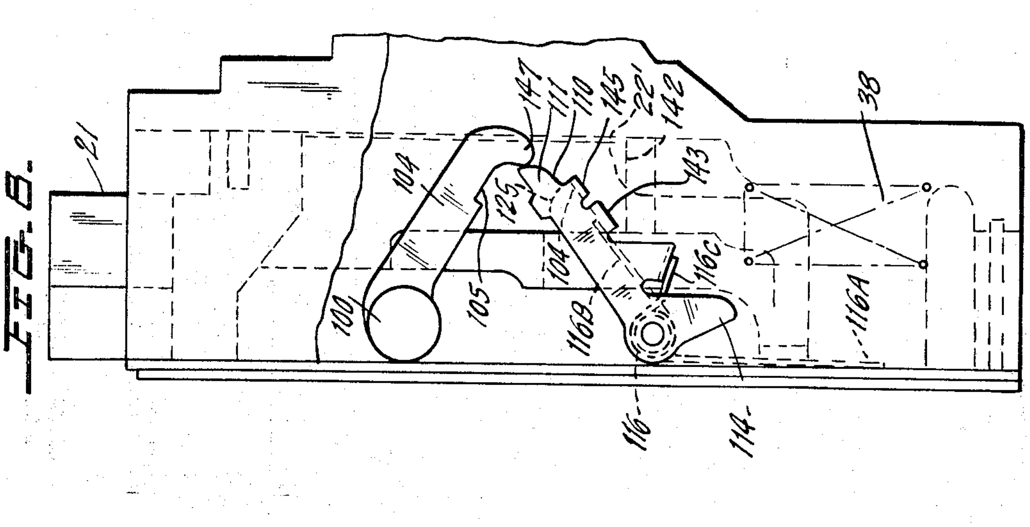
FIG. 8 is a view similar to FIGS. 5 and 7 with the manual operating handle depressed in turning the circuit breaker OFF.

Operation of circuit breaker 20 to the ON position is effected by depressing handle 20 to the position shown in FIGS. 9 and 10. This brings cam surface 151 of the respective handle extensions 141A, 141B and 141C into engagement with their associated contact arms 46 at surfaces 152 driving contact arm 46 to its left most position as seen in FIG. 9 against the forces of springs 62. Contact arm mounting pin 54 is now disposed in the righthand end of slot 53 with respect to FIG. 9. Upon release of handle 21 cam 151 moves free of contact arm surface 152 so that main spring 62 is effective to first drive latch end 76 against latch tip 76 and thereafter rotate contact arm 46 counterclockwise with respect to pivot 54 so that movable contact 45 engages stationary contact 44.

As handle 21 is moved inward to the position of FIG. 9, formation 161 of handle extension 140 engages lever lug 149 rotating lever 110 in a clockwise direction to a position such that the lever tip 111 is below but rotationally in line with the notch 105 in the arm 104 of the common trip bar as sohwn in FIG. 10. Ratchet 125, being biased to a clockwise direction by the end 116B of the spring 116 moves with lever 110 until a point where ratchet lug 143 engages surface 163 of handle extension 140. As handle 21 is released from its position of FIG. 10 tripper bar 100 moves clockwise and lever 110 moves counterclockwise until these elements assume their positions of FIG. 5. At this time handle extension surface 163 no longer supports ratchet 125 so that it now moves clockwise into engagement with lever 110.

Thus, it is seen that the instant invention provides a force multiplier in the form of a convex cam surface to increase tripping forces and thereby achieve improved reliability.

Although there has been described a preferred embodiment of this novel invention, many variations and modifications will now be apparent to those skilled in the art, therefore, this invention is to be limited, not only by the specific disclosure herein, but only by the appending claims.

We claim:

1. Circuit interrupting apparatus having a plurality of phases; each of said phases including a stationary contact, a movable contact arm to which said movable contact is mounted, pivot means mounting said arm for movement between a first position wherein said contacts are engaged and a second position wherein said contacts are disengaged, biasing means urging said arm to said second position, a latch means for maintaining said arm in said first position, trip means for automatically releasing said latch means upon the occurrence of predetermined fault conditions, cam means through which motion of said arm in moving from said first to said second position is transmitted to said latch means to impart additional movement thereto in an unlatching direction after unlatching thereof; a common trip member operatively positioned with respect to all of said latch means whereby motion imparted to the latch means of any of said plurality of phases by movement of the arm of this phase is transmitted through said common trip member to release the latch means of the remaining phases of said plurality of phases.

2. Circuit interrupting apparatus as set forth in claim 1 in which the cam means is formed by a convex surface of said latch means.

3. Circuit interrupting apparatus as set forth in claim 2 in which the pivot means is located at a point intermediate the ends of said arm, said movable contact mounted at one end of said arm, a follower portion at the other end of said arm positioned to wipe across said convex surface as said arm operates from said first to said second position.

4. Circuit interrupting means as set forth in claim 3 in which there is another pivot means for said latch means, said pivot means being parallel to and latearlly spaced from said another pivot means, said follower portion extending generally parallel to said pivot means, said convex surface being along the edge of a latch means portion extending generally parallel to a plane in which said arm moves between said first and said second positions.

5. Circuit interrupting apparatus as set forth in claim 4 also including an insulating housing enclosing the elements previously recited; a contact operating mechanism within said housing; a handle extending through an aperture in the top surface of said housing and connected to said mechanism for controlling same to operate said contacts of all phases; for each of said phases, a line terminal connetced to one of said contacts and a load terminal connected to the other of said contacts to said line and said load terminals of all of said phases extending through apertures in the back surface of said housing; mechanical means extending from another surface of said housing for securing said circuit interrupting apparatus in a panelboard.

6. Circuit interrupting apparatus as set forth in claim 5 in which there are at least three phases.

References Cited

UNITED STATES PATENTS 2,638,519 5/1953 Jackson ---------------- 335—9
3,233,063 2/1966 Platz ------------------ 335—9

BERNARD A. GILHEANY, Primary Examiner

H. BROOME, Assistant Examiner